(12) United States Patent
Bauhof

(10) Patent No.: US 6,908,132 B2
(45) Date of Patent: Jun. 21, 2005

(54) INTEGRAL STRUCTURES OF METAL AND PLASTIC

(75) Inventor: Michael J. Bauhof, Troy, MI (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/085,803

(22) Filed: Feb. 27, 2002

(65) Prior Publication Data
US 2002/0157775 A1 Oct. 31, 2002

Related U.S. Application Data
(60) Provisional application No. 60/271,939, filed on Feb. 28, 2001.

(51) Int. Cl.[7] .............................................. B62D 39/00
(52) U.S. Cl. ................. 296/1.01; 296/193.09; 428/458
(58) Field of Search ........................... 295/1.01, 187.09, 295/193.09, 203.02, 1.1; 156/245, 292; 428/98, 199, 131, 458, 119

(56) References Cited

U.S. PATENT DOCUMENTS

| 4,569,865 A | | 2/1986 | Placek et al. |
| 4,682,809 A | | 7/1987 | Huss |
| 5,085,722 A | | 2/1992 | Sikorski |
| 5,190,803 A | * | 3/1993 | Goldbach et al. ........... 428/120 |
| 5,580,122 A | | 12/1996 | Muehlhausen |
| 5,658,041 A | * | 8/1997 | Girardot et al. ....... 296/193.09 |

FOREIGN PATENT DOCUMENTS

| EP | 967 138 A2 | 12/1999 |
| EP | 995 688 A1 | 4/2000 |
| WO | WO 00/56517 | 9/2000 |

* cited by examiner

Primary Examiner—Lori L. Coletta

(57) ABSTRACT

Integral structures are formed using a combination of both metal and plastic. These materials are secured together by the unique design of the metal in areas of contact with the plastic. Ribbed structures in which metal is suitably joined with injection molded plastic are also contemplated herein.

7 Claims, 2 Drawing Sheets

INTEGRAL STRUCTURES OF METAL AND PLASTIC

CROSS-REFERENCE TO RELATED APPLICATIONS

This application claims the benefit of U.S. Provisional Application No. 60/271,939, filed Feb. 28, 2001.

FIELD OF THE INVENTION

The present application relates to structures made from a combination of both metal and plastic. More particularly, the present invention relates to ribbed structures in which metal is suitably joined with injection molded plastic.

BACKGROUND OF THE INVENTION

Material selection for the development and fabrication of structures involves any number of considerations. For example, the use of metals offers obvious benefits in strength while the use of plastics offers equally attractive benefits in moldability and lack of conductivity. However it is also well recognized that any materials also necessarily carry design limitations. For example, metals are obviously quite heavy and may not be suitable for weight-constrained applications, while plastics may not be suitable for applications requiring rigidity and durability. Researchers have long been interested in developing approaches to bring metals and plastics together into a structure or application.

U.S. Pat. No. 5,085,722 provides a composite material of a flat metal substrate with a number of apertures, with plastic material and reinforcing fibers that attach to the metal through these apertures. The composite is described as having greater fracture resistance and impact strength than the non-metallic material alone, while also limiting the transmission of temperature effects through the composite versus what would be experienced if only metal were used.

U.S. Pat. No. 4,569,865 discloses light weight, corrosion resistant automotive bumpers including thin metal outer shells bonded to rigid but resilient foamed plastic cores. An intermediate primer layer preferably of ethylene copolymer is used in the bonding process. The metal is preferably stainless steel or aluminum. Because no bolts are used, the metal layer offers superior corrosion resistance and a smooth appearance.

U.S. Pat. No. 4,682,809 describes a body construction for lightweight passenger vehicles including an elongated shell of highly impact resistant plastics material. A metal chassis is secured to this shell to form an integrated composite structure. This construction offers improved rigidity for body constructions of battery-powered vehicles.

While each of the above approaches may be of interest in their respective selected applications, they are not readily adaptable to a wide range of uses. For example, each requires reinforcing fibers or foamed materials or is limited in scope to large shell-type applications. These and other teachings are generally representative of the techniques and constraints evidenced to date in developing structures of this variety.

There is a need therefore for an integral structure of metal and plastic, in which the plastic is firmly secured to the metal and can nevertheless be injection molded using conventional molding techniques and without requiring special processing.

An object of the instant invention is to provide useful integral structures of metal and plastic in which the materials are effectively joined to form rigid and durable assemblies.

A further object of the instant invention is to provide such structures whereby the designer can incorporate plastic ribs to provide further support as may be required for particular applications. A feature of the instant invention resides in the variety of shapes that can be fashioned using the approaches described herein, and with them the number of applications for which this invention is suitable. An advantage of the instant invention is the range of materials that may be selected and suitable for forming integral structures therefrom.

These and other objects, features, and advantages will become better understood upon having reference to the following description of the invention.

SUMMARY OF THE INVENTION

An integral structure is disclosed comprising a metal surface and one or more plastic support members attached thereto. The metal surface comprises at least one edge portion formed sufficient to secure at least one support member therealong.

BRIEF DESCRIPTION OF THE DRAWINGS

The invention will be better illustrated upon having reference to the drawings herein and as follows.

DETAILED DESCRIPTION OF THE INVENTION

Figure 1:
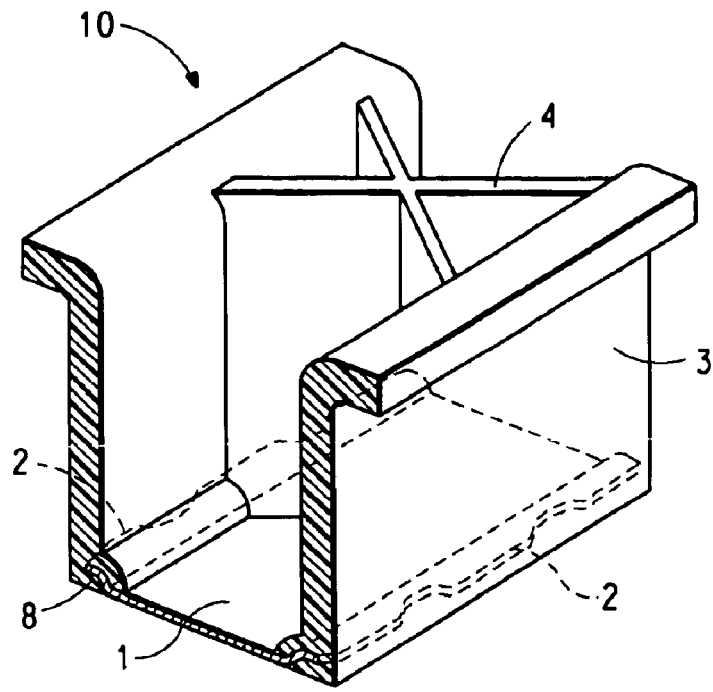
FIG. 1 is a perspective view in partial transparency of a structural component of the present invention and having metal and plastic members.

Having reference to FIG. 1, there is shown generally an integral structure 10 of metal with molded plastic. In this illustration the main member 1 of the structural component is metal, and includes edge portions 2. At least one edge portion 2 or any part thereof is formed with an undulating or serrated pattern (shown in the transparent portion of the drawing) to promote better contact and a more secured fit of the molded plastic to the edge. Another means of achieving this enhanced contact and fit (and also shown in FIG. 1) is to provide a bend or curve 8 in the main member 1, again in the area of contact with the plastic.

There are no restrictions on the exact configuration of the undulating or serrated pattern of the edge portion 2 or of the aforementioned bend or curve 8. One skilled in the art will select a suitable design to conform to the dimensional constraints of the integral structure 10 and at the same time meet the functional specifications required of the structure itself.

Referring once more to FIG. 1, support members 3 attach to the main member 1 at respective edge portions 2. As shown, these support members 3 extend generally perpendicular to the main member 1, in effect forming "side walls". The support members 3 in this illustration are formed from plastic. Ribs 4 are also formed from plastic as shown and connect the support members 3 to each other and provide additional rigidity to the integral structure as warranted. One skilled in the art will selectively introduce the ribs 4 as one of many possible approaches to providing a more rigid assembly.

Figure 2:
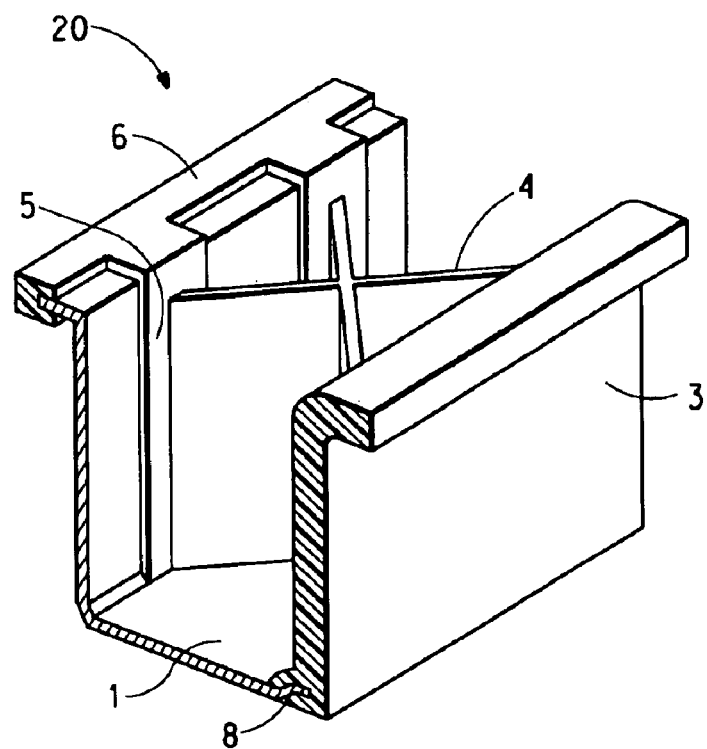
FIG. 2 is a perspective view of another embodiment of a structural component of the present invention, depicting a substantially larger metal portion than in the previous figure.

Having reference to FIG. 2, another variant of the integral structure is shown generally at 20. In this illustration, the main member 1 that is formed from metal is formed into an "L"-shaped design, so that it simultaneously serves as both a base and a sidewall. Other features of the figure are as depicted in FIG. 1, except that rib supports 5 are positioned between the ribs 4 and the sidewall portion of the main member 1. Moreover, the rib supports 5 connect with lip 6 which serves to lock with the main member 1. These rib supports 5 and lip 6 are made of plastic.

Figure 3:
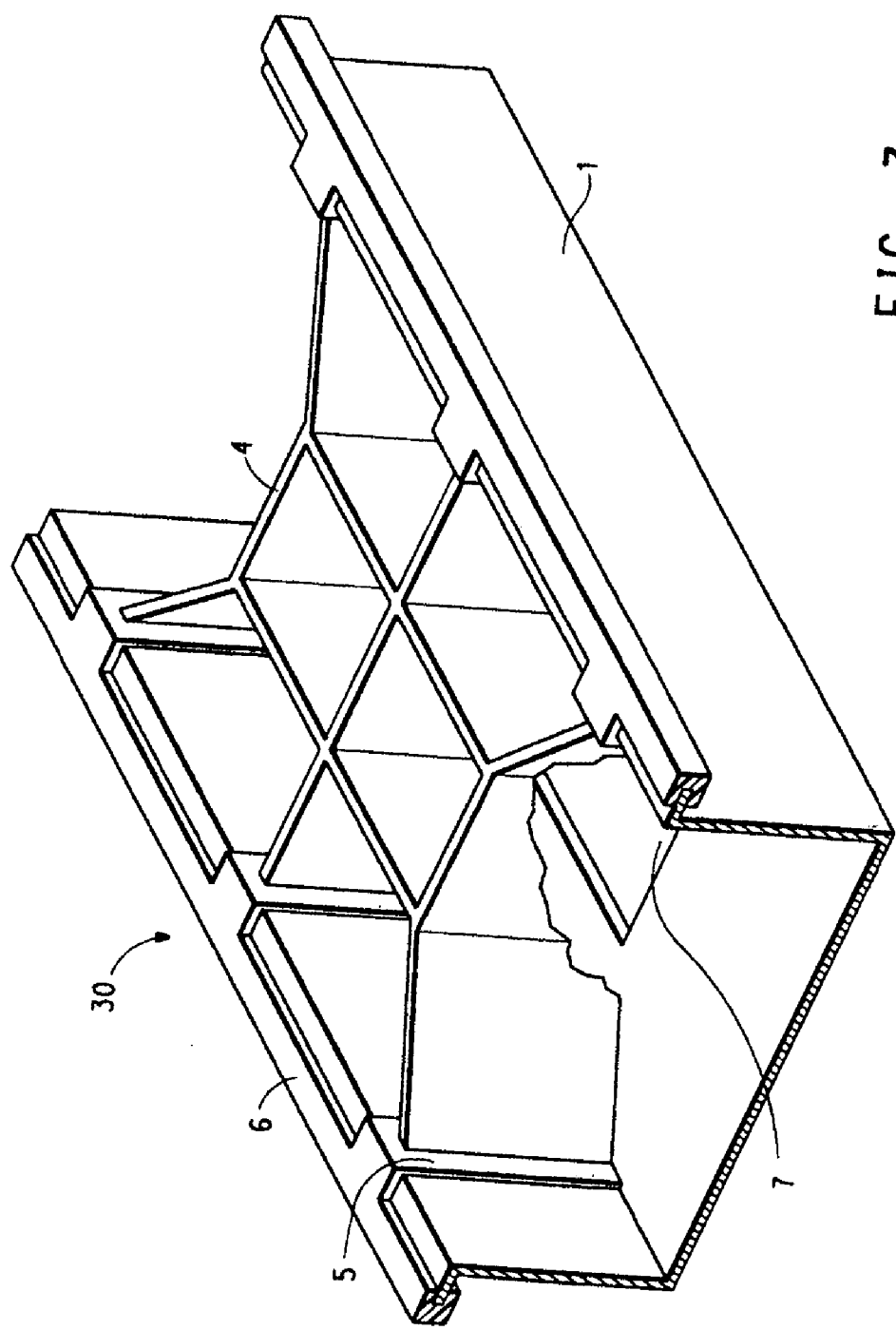
FIG. 3 is a cut-away view of still another embodiment of a structural component of the present invention, depicting a metal stamping with overmolded plastic incorporated thereupon.

Another design for an integral metal and plastic structure is shown in FIG. 3 generally at 30. It incorporates several design features earlier depicted in FIGS. 1 and 2, with the exception of the aperture 7 formed along the surface of main member 1. Further, the ribs 4 are arranged in a unique pattern to traverse the aperture 7.

Materials suitable for practice in conjunction with the structure of the invention are limited only by the intended shape and function of the structure itself. For example, metals useful with this invention may be of a more conventional variety (eg steel, aluminum, nickel and the like) or may be selected for their properties that benefit specialized applications (eg titanium, brass and the like). Likewise, plastics useful with this invention include not only polyamides (such as ZYTEL ® nylon resins available from E. I. DuPont de Nemours & Co.) but also polyesters, liquid crystalline polymers, and the like. Polymers which may be injection molded are particularly preferred.

The structures herein may be produced using conventional metal working and plastic molding techniques, all as will be readily appreciated and known by those having ordinary skill in the art. Metal stamping operations are noted as of particular interest, coupled with the injection molding of polymer resin onto the formed metal surface to develop the metal/plastic structure.

A wide range of uses is contemplated for structures as disclosed herein. One area of particular interest is in module assemblies such as those of interest to automotive applications. A module assembly is a self-contained assembly of electronic and mechanical components. Often these modules require intricate backbone structures which can benefit from the technology of combining both plastic molding for function and detail with metals for strength, stiffness and dimensional control. For example, and owing to the balance of metal with plastic in a way that forms a rigid, durable assembly capable of supporting numerous elements, such structures provide a platform upon which one can secure a number of automobile parts. One such platform is known as a "front end module", and provides an intricate molding for the attachment of headlight assemblies, shrouds, wiring harnesses, and the like.

It is readily apparent to those having skill in the art that a number of variations in design and materials selection are within the scope and purview of this invention. Such variations are considered as within the scope thereof.

What is claimed is:

1. An integral structure comprising a metal surface and one or more plastic support members or plastic rib supports attached to said metal surface, wherein said metal surface comprises at least one edge portion formed at least in part with an undulating or serrated pattern along which one support member is secured or wherein at least one rib support is connected to sold metal surface with a lip.

2. The integral structure of claim 1 further comprising ribs incorporated therealong.

3. The integral structure of claim 1 wherein said metal surface has an aperture formed therein.

4. The integral structure of claim 1 wherein said plastic support members and ribs are made of polyamide.

5. An article comprising an integral structure comprising a metal surface and one or more plastic support members or plastic rib supports attached to said metal surface, wherein said metal surface comprises at least one edge portion formed at least in part with an undulating or serrated pattern along which one support member is secured or wherein at least one rib support is connected to said metal surface with a lip.

6. The article of claim 5 in the form of front end module.

7. The integral structure of claim 1 wherein said metal surface comprises at least one edge portion formed at least in part with an undulating or serrated surface and a bend or curve.

* * * * *